US005731082A

United States Patent [19]

Gross et al.

[11] Patent Number: 5,731,082

[45] Date of Patent: Mar. 24, 1998

[54] TREE RESISTANT CABLE

[75] Inventors: Laurence Herbert Gross, Bridgewater, N.J.; Alfred Mendelsohn, Brooklyn, N.Y.

[73] Assignee: Union Carbide Chemicals & Plastics Technology Corporation, Danbury, Conn.

[21] Appl. No.: 669,602

[22] Filed: Jun. 24, 1996

[51] Int. Cl.$^6$ .............................. B32B 15/00; D02G 3/00; H01B 7/00

[52] U.S. Cl. .............................. 428/379; 428/375; 428/378; 428/383; 428/401; 174/113 R; 174/110 SR; 174/110 PM; 174/120 SR; 525/53; 525/320; 525/321

[58] Field of Search .............................. 428/379, 378, 428/375, 383; 174/110 R, 110 SR, 110 PM, 113 R; 525/53, 320, 321

[56] References Cited

U.S. PATENT DOCUMENTS

| | | | |
|---|---|---|---|
| 4,812,505 | 3/1989 | Topcik | 524/377 |
| 5,047,468 | 9/1991 | Lee et al. | 525/53 |
| 5,246,783 | 9/1993 | Spenadel et al. | 428/461 |
| 5,503,914 | 4/1996 | Michie et al. | 428/220 |

*Primary Examiner*—Patrick Ryan
*Assistant Examiner*—J. M. Gray
*Attorney, Agent, or Firm*—Saul R. Bresch

[57] ABSTRACT

A cable comprising one or more electrical conductors or a core of one or more electrical conductors, each conductor or core being surrounded by a layer of insulation comprising a multimodal copolymer of ethylene and one or more alpha-olefins, each alpha-olefin having 3 to 8 carbon atoms, the copolymer having a broad comonomer distribution as measured by TREF with a value for the percent of copolymer, which elutes out at a temperature of greater than 90 degrees C., of greater than about 5 percent; a WTGR value of less than about 20 percent; a melt index in the range of about 0.1 to about 30 grams per 10 minutes; and a density in the range of 0.880 to 0.950 gram per cubic centimeter, and being prepared by a low pressure process.

1 Claim, No Drawings

TREE RESISTANT CABLE

TECHNICAL FIELD

This invention relates to electric power cable insulated with a polyethylene composition having an improved resistance to water trees.

BACKGROUND INFORMATION

A typical electric power cable generally comprises one or more conductors, which form a cable core that is surrounded by several layers of polymeric material including a first semiconducting shield layer, an insulating layer, a second semiconducting shield layer, a metallic tape or wire shield, and a jacket.

These insulated cables are known to suffer from shortened life when installed in an environment where the insulation is exposed to water, e.g., underground or locations of high humidity. The shortened life has been attributed to the formation of water trees, which occur when an organic polymeric material is subjected to an electrical field over a long period of time in the presence of water in liquid or vapor form. The net result is a reduction in the dielectric strength of the insulation.

Many solutions have been proposed for increasing the resistance of organic insulating materials to degradation by water treeing. The most recent solutions involve the addition of polyethylene glycol, as a water tree growth inhibitor, to a heterogeneous low density polyethylene such as described in U.S. Pat. Nos. 4,305,849; 4,612,139; and 4,812,505. Another solution is the use of a homogeneous polyethylene per se as the organic insulating material, i.e., without the addition of a water tree growth inhibitor. See U.S. Pat. No. 5,246,783. Both of these solutions appear to be steps in the right direction, but there is a continuous industrial demand for improvement partially because power cable is increasingly exposed to harsher environments, and partially because consumers are more concerned with cable longevity, e.g., a service life of 30 to 40 years.

DISCLOSURE OF THE INVENTION

An object of this invention, therefore, is to provide an insulated cable which exhibits a much improved resistance to water trees. Other objects and advantages will become apparent hereinafter.

According to the invention, an insulated cable has been discovered which meets the above object.

The cable comprises one or more electrical conductors or a core of one or more electrical conductors, each conductor or core being surrounded by a layer of insulation comprising a multimodal copolymer of ethylene and one or more alpha-olefins, each alpha-olefin having 3 to 8 carbon atoms, said copolymer having a broad comonomer distribution as measured by TREF with a value for the percent of copolymer, which elutes out at a temperature of greater than 90 degrees C., of greater than about 5 percent; a WTGR value of less than about 20 percent; a melt index in the range of about 0.1 to about 30 grams per 10 minutes; and a density in the range of 0.880 to 0.950 gram per cubic centimeter, and being prepared by a low pressure process.

DESCRIPTION OF THE PREFERRED EMBODIMENT(S)

The polyethylenes of interest here are copolymers of ethylene and one or more alpha-olefins, which have a broad molecular weight distribution and a broad comonomer distribution. They also have a number of other defined characteristics. The copolymers can be multimodal, but are preferably bimodal or trimodal. A copolymer is a polymer formed from the polymerization of two or more monomers and includes terpolymers, tetramers, etc. In this specification, the term "multimodal (or bimodal, trimodal, etc.) copolymer" is considered to mean a single copolymer or a blend of copolymers provided that the single copolymer and the blend are multimodal and have a broad comonomer distribution as well as other attributes.

The alpha-olefins have 3 to 8 carbon atoms. Examples of the alpha-olefins are propylene, 1-butene, 1-hexene, 4-methyl-1-pentene, and 1-octene.

As noted above, the copolymers can have a density in the range of 0.880 to 0.950 gram per cubic centimeter, and preferably have a density in the range of 0.880 to about 0.930 gram per cubic centimeter. They also can have a melt index in the range of about 0.1 to about 30 grams per 10 minutes, and preferably have a melt index in the range of about 0.5 to about 10 grams per 10 minutes. Melt index is determined in accordance with ASTM D-1238, Condition E, measured at 190 degrees C. The copolymers have a broad comonomer distribution as measured by TREF with a value for the percent of copolymer, which elutes out at a temperature of greater than 90 degrees C., of greater than about 5 percent, and preferably greater than about 10 percent. The copolymers can also have a WTGR value of less than about 20 percent, preferably less than about 10 percent, and most preferably less than about 5 percent. TREF and WTGR are discussed below.

The polyethylenes used in subject invention are preferably produced in the gas phase by various low pressure processes. They can also be produced in the liquid phase in solutions or slurries by conventional techniques. Low pressure processes are typically run at pressures below 1000 psi whereas high pressure processes are typically run at pressures above 15,000 psi. Typical catalyst systems, which can be used to prepare these polyethylenes, are magnesium/titanium based catalyst systems, which can be exemplified by the catalyst system described in U.S. Pat. No. 4,302,565 and a spray dried catalyst system described in U.S. Pat. No. 5,290,745; vanadium based catalyst systems such as those described in U.S. Pat. Nos. 4,508,842 and 4,918,038; a chromium based catalyst system such as that described in U.S. Pat. No. 4,101,445; metallocene catalyst systems such as those described in U.S. Pat. Nos. 5,272,236 and 5,317,036; or other transition metal catalyst systems. Many of these catalyst systems are often referred to as Ziegler-Natta catalyst systems. Catalyst systems, which use chromium or molybdenum oxides on silica-alumina supports, are also useful. Typical processes for preparing the polyethylenes are also described in the aforementioned patents. Typical in situ polyethylene blends and processes and catalyst systems for providing same are described in U.S. Pat. Nos. 5,371,145 and 5,405,901.

As long as the blend, whether formed in situ or by mechanical means, is multimodal and has a broad comonomer distribution, the polymers can be blended in varying amounts in the range of about 1 to about 99 percent by weight.

Conventional additives, which can be introduced into the polyethylene formulation, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Fillers and additives can be added in amounts ranging from less than about 0.1 to more than about 200 parts by weight for each 100 parts by weight of the base resin, in this case, polyethylene.

Examples of antioxidants are: hindered phenols such as tetrakis[methylene(3,5-di-tert-butyl-4-hydroxyhydrocinnamate)]-methane, bis[(beta-(3,5-ditert-butyl-4-hydroxybenzyl)methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenylphosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of polyethylene.

The resins in the formulation can be crosslinked by adding a crosslinking agent to the composition or by making the resin hydrolyzable, which is accomplished by adding hydrolyzable groups such as —$Si(OR)_3$ wherein R is a hydrocarbyl radical to the resin structure through copolymerization or grafting.

Suitable crosslinking agents are organic peroxides such as dicumyl peroxide; 2,5-dimethyl- 2,5-di(t-butylperoxy) hexane; t-butyl cumyl peroxide; and 2,5-dimethyl-2,5-di(t-butylperoxy)hexane-3. Dicumyl peroxide is preferred.

Hydrolyzable groups can be added, for example, by copolymerizing (in the case of the homogeneous polyethylene) ethylene and comonomer(s) with an ethylenically unsaturated compound having one or more —$Si(OR)_3$ groups such as vinyltrimethoxy- silane, vinyltriethoxysilane, and gamma-methacryloxypropyltrimethoxysilane or grafting these silane compounds to the either resin in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred.

Examples of hydrolyzable copolymers and hydrolyzable grafted copolymers are ethylene/comonomer/vinyltrimethoxy silane copolymer, ethylene/comonomer/gamma- methacryloxypropyltrimethoxy silane copolymer, vinyltrimethoxy silane grafted ethylene/comonomer copolymer, vinyltrimethoxy silane grafted linear low density ethylene/1-butene copolymer, and vinyltrimethoxy silane grafted low density polyethylene or ethylene homopolymer.

The cable of the invention can be prepared in various types of extruders, e.g., single or twin screw types. Compounding can be effected in the extruder or prior to extrusion in a conventional mixer such as a BRABENDER™ mixer; a BANBURY™ mixer; or the twin screw extruder. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C.

The advantages of the invention lie in the much improved water tree growth rate; that additives used to enhance water tree resistance can be avoided; that the "all" polyethylene composition takes full advantage of the desirable electrical characteristics of polyethylene, for example, its low dissipation factor and excellent AC breakdown strength; and the composition being useful in low, medium, and high voltage applications.

The patents mentioned in this specification are incorporated by reference herein.

The invention is illustrated by the following examples.

EXAMPLES 1 TO 11

The resistance of insulating compositions to water treeing is determined by the method described in U.S. Pat. No. 4,144,202. This measurement leads to a value for water tree resistance relative to a standard polyethylene insulating material. The term used for the value is "water tree growth rate" (WTGR). The lower the values of WTGR, the better the water tree resistance. The WTGR values are stated in percent.

TREF is also measured. The measurement is a technique, well recognized by those skilled in the art. The acronym stands for Temperature Rising Elution Fractionation. When more than 5 (preferably more than 10) percent by weight of the resin has an elution temperature greater than 90 degrees C., a broad comonomer distribution and a lower WTGR are indicated. Generally, the higher the TREF value, the lower the WTGR. The TREF values are stated in percent of the resin, which elutes out at greater than 90 degrees C.

100 parts by weight of each of the three copolymers of ethylene described below are compounded in a twin screw BRABENDER™ extruder with 0.35 part by weight of the primary antioxidant, thiodiethylene bis(3,5-di-tert-butyl-4-hydroxy)hydro-cinnamate, and 0.35 part by weight of the secondary antioxidant, distearyl thio dipropionate. The extruder is run at 60 revolutions per minute (rpm) at a 155 degree C. melt temperature. A second pass in the same equipment under the same conditions is run in order to better homogenize the mixture. To this mixture (held at 75 degrees C.) is added 1.7 parts dicumyl peroxide via a 125 to 130 degree C. fluxing on a two roll mill to provide an oscillating disk rheometer (5 degree arc at 360 degrees F.) reading of 32.9 inch-pounds of torque (COPOLYMER A), 33.8 inch-pounds of torque (COPOLYMER B), and 33.8 inch-pounds of torque (COPOLYMER C), respectively. Each composition is then removed from the two roll mill as a crepe and diced and molded into one inch discs which are 0.25 inch thick in a press in two steps:

| | initial step | final step |
|---|---|---|
| pressure (psi) | low | high |
| temperature (°C.) | 120 | 175 |
| residence time (minutes) | 9 | 15 to 20 |

COPOLYMER A: This copolymer is an in situ blend of a copolymer of ethylene and 1-hexene as the high molecular weight component and a copolymer of ethylene and 1-butene as the low molecular weight component. Copolymer A is bimodal; has a density of 0.923 gram per cubic centimeter; a melt index of 0.6 gram per 10 minutes; a flow index of 77 grams per 10 minutes. Flow index is determined under ASTM D-1238, Condition F, at 190 degrees C. and 21.6 kilograms.

COPOLYMER B: This copolymer is a 50:50 percent by weight mechanical blend of a copolymer of ethylene and 1-hexene as the high molecular weight component and a copolymer of ethylene and 1-hexene as the low molecular weight component. The high molecular weight component has a density of 0.895 gram per cubic centimeter and a flow index of 4.5 grams per 10 minutes. The low molecular weight component has a density of 0.924 gram per cubic centimeter and a melt index of 500 grams per 10 minutes. The blend is bimodal.

COPOLYMER C: This copolymer is a heterogeneous copolymer of ethylene and 1-hexene made in a low pressure process using a magnesium/titanium catalyst system. It is monomodal and has a density of 0.905 gram per cubic centimeter and a melt index of 4 grams per 10 minutes.

COPOLYMER D: This copolymer is a heterogeneous copolymer of ethylene and 1-butene made in a low pressure process using a magnesium/titanium catalyst system. It is monomodal and has a density of 0.905 gram per cubic centimeter and a melt index of 4 grams per 10 minutes.

COPOLYMER E: This copolymer is bimodal. The low molecular weight component is a copolymer of ethylene and 1-butene and the high molecular weight component is a copolymer of ethylene and 1-hexene. The bimodal copolymer has a density of 0.913 gram per cubic centimeter; a melt index of 0.6 gram per 10 minutes; and a flow index of 50 grams per 10 minutes. This copolymer is treated in the same fashion as the above copolymers except that the primary antioxidant is 0.4 part by weight of vinyl modified polydimethylsiloxane; the secondary antioxidant is 0.75 part by weight of p-oriented styrenated diphenylamine; and the bimodal copolymer has an oscillating disk rheometer (5 degree arc at 360 degrees F.) reading of 48 inch-pounds of torque.

COPOLYMERs F to I are monomodal copolymers of ethylene and an alpha-olefin (1-octene) made by the polymerization of the comonomers in the presence of metallocene single site catalyst systems. The melt indices and the densities are shown in the Table.

COPOLYMERs J and K are monomodal copolymers of ethylene and 1-hexene made by the polymerization of the comonomers in the presence of metallocene single site catalyst systems.

COPOLYMERs D and F to K are formulated in a similar manner to the other copolymers mentioned above.

Each resin formulation is tested for WTGR and the results compared with a control polyethylene homopolymer, which exhibits 100 percent WTGR. Each resin formulation is also tested for TREF. Variables and results are set forth in the following Table:

TABLE

| Example | COPOLYMER | MI (g/10 min) | Density (g/cc) | TREF (%) | WTGR (%) |
|---|---|---|---|---|---|
| 1 | A | 0.6 | 0.923 | 25.1 | 3.6 |
| 2 | B | 1.0 | 0.910 | 26.2 | 0.7 |
| 3 | C | 4.0 | 0.905 | 12.2 | 5 |
| 4 | D | 4.0 | 0.905 | 23.2 | 10 |
| 5 | E | 0.6 | 0.913 | 14.9 | 2.3 |
| 6 | F | 5.0 | 0.870 | 1.2 | 68 |
| 7 | G | 3.5 | 0.910 | less than 0.1 | 40 |
| 8 | H | 1.0 | 0.902 | less than 0.1 | 81 |
| 9 | I | 1.0 | 0.870 | 1.1 | 179 |
| 10 | J | 1.7 | 0.923 | 2.1 | 258 |
| 11 | K | 2.5 | 0.908 | 1.8 | 172 |

In testing COPOLYMER E for (i) AC breakdown strength and (ii) dissipation factor, respectively, the results are (i) 83 percent retained AC breakdown strength after 21 days at 6 kilovolts at 1 kilohertz for a 50 roll thick specimen and (ii) a very flat dissipation factor at less than 200 microradians for the entire temperature range of 23 to 95 degrees C.

The above results are confirmed by the extrusion coating of the above resin formulations on 14 AWG (American Wire Gauge) copper wires, and appropriate testing of the coated wires. The thickness of the coatings is 50 mils.

We claim:

1. A cable comprising one or more electrical conductors or a core of one or more electrical conductors, each conductor or core being surrounded by a layer of insulation comprising a bimodal copolymer of ethylene and one or more alpha-olefins wherein each alpha-olefin is 1-butene, 1-hexene, 4-methyl-1-pentene, or 1-octene, said copolymer having a broad comonomer dispersion as measured by TREF with a value for the percent of copolymer, which elutes out at a temperature of greater than 90 degrees C., of greater than about 10 percent; a WTGR value of less than about 5 percent; a melt index in the range of about 0.5 to about 10 grams per 10 minutes; and a density in the range of 0.880 to 0.930 gram per cubic centimeter, and being prepared by a low pressure process.

* * * * *

UNITED STATES PATENT AND TRADEMARK OFFICE

CERTIFICATE OF CORRECTION

PATENT NO. : 5,731,082

DATED : March 24, 1998

INVENTOR(S) : L.H. Gross

It is certified that error appears in the above-indentified patent and that said Letters Patent is hereby corrected as shown below:

Column 6, line 48, change "dispersion" to --distribution--.

Signed and Sealed this

Seventh Day of July, 1998

Attest:

BRUCE LEHMAN

Attesting Officer

*Commissioner of Patents and Trademarks*